J. K. STEWART, DEC'D.
J. B. STEWART, EXECUTRIX.
MAGNETIC SPEEDOMETER.
APPLICATION FILED SEPT. 12, 1916.

1,238,455. Patented Aug. 28, 1917.

Witnesses:

Inventor:
Julia B. Stewart,
Executrix of the Estate of
John K. Stewart Deceased by Burton & Burton
his Attys.

UNITED STATES PATENT OFFICE.

JOHN K. STEWART, DECEASED, BY JULIA B. STEWART, EXECUTRIX, OF NORTHPORT, NEW YORK; SAID JOHN K. STEWART ASSIGNOR TO STEWART-WARNER SPEEDOMETER CORPORATION, OF CHICAGO, ILLINOIS, A CORPORATION OF VIRGINIA.

MAGNETIC SPEEDOMETER.

1,238,455.  Specification of Letters Patent.  Patented Aug. 28, 1917.

Original application filed January 27, 1913, Serial No. 744,343. Divided and this application filed September 12, 1916. Serial No. 119,643.

*To all whom it may concern:*

Be it known that I, JULIA B. STEWART, a citizen of the United States, residing at Northport, in the county of Suffolk and State of New York, am the executrix of the last will and testament of JOHN K. STEWART, deceased, who had invented new and useful Improvements in Magnetic Speedometers, of which the following is a specification, reference being had to the accompanying drawings, forming a part thereof.

This application is a division of the application of John K. Stewart, Serial No. 744,343, filed January 27, 1913, now Patent No. 1,200,899, dated October 10, 1916.

The invention to which this application relates is an improvement in magnetic speedometers, particularly with respect to means for damping the vibrating or oscillating element to make it what is commonly called "dead-beat". It consists in the elements and features of construction shown and described, as indicated in the claims.

Figure 1:
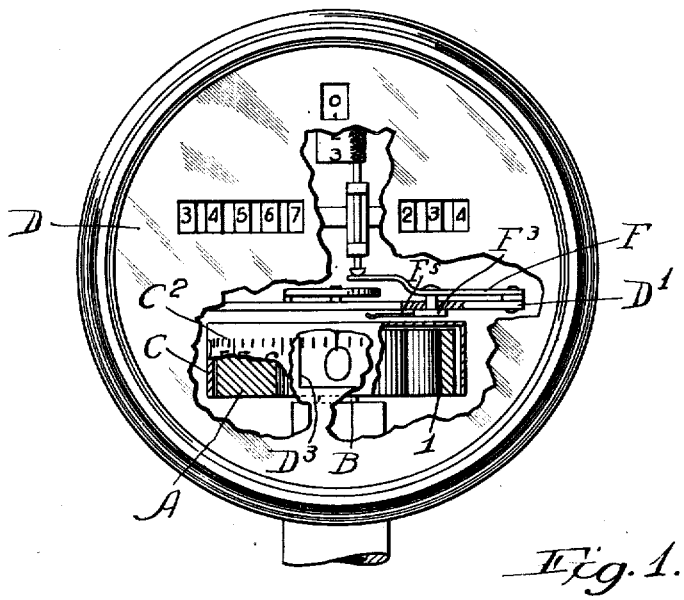
Figure 1 is a front elevation of an instrument embodying this invention, the face plate being broken away to disclose the structure and the magnets and the drag element being shown in diametric section at the line, 1—1, on Fig. 2.
Figure 2:
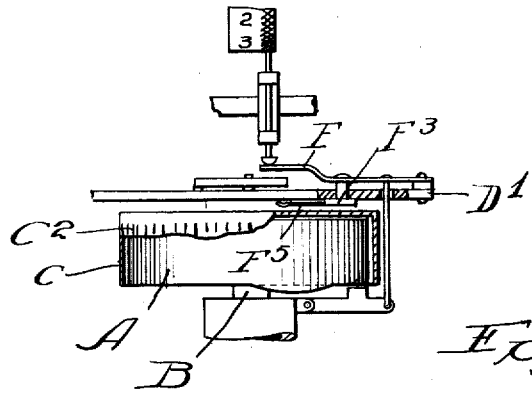
Fig. 2 is a detail view of a modification, the parts being seen looking in the same direction as in Fig. 1, the drag element being partly broken away to disclose the magnet underneath.

As shown in the drawings, this invention is embodied in a magnetic speedometer of familiar type which comprises a magent, A, rotatably mounted upon a shaft, B, for influencing a drag element, C, which latter carries the speed-indicating scale, $C^2$, readable at the window, $D^3$, in the face plate, D. To overcome the liability of the drag element to be over-actuated by sudden changes of speed of rotation of the magnet, and in consequence to oscillate back and forth and fail to give a steady indication, that is, to fail to be what is commonly called "dead beat", there is mounted upon the frame bar, $D^1$, a light spring arm, F, which carries at its free end a button, $F^3$, of magnetic material positioned to overhang the path of rotation of the notch or gap, 1, in the ring magnet, A, or, in effect, over the path of rotation of the poles of the magnet, so that every time said notch or the magnet poles pass under the button, $F^3$, in the rotation of the magnet, the button is drawn downwardly by the magnetic force acting against the yielding resistance of the spring arm, F, and bring the button, or its spring finger hereinafter mentioned, in contact with the upper surface of the drag member, C, for the instant that the poles are passing the button, the reaction of the spring arm retracting the button as soon as the poles have passed. The momentary contact with the button, or its spring finger hereinafter mentioned, with the drag disk serves to check its oscillation without preventing it from eventually obtaining the movement which it should derive from the drag action of the magnet, but preventing it from having any long uninterrupted swing which would cause it by momentum to swing farther than the natural drag action of the magnet would cause it to swing, and it is thus rendered "dead beat", and steady in its indication of the speed which it is the purpose of the instrument to indicate.

Preferably, in order that the contact produced by the attraction of the magnet for the armature button may be suitably soft, and thereby not liable by its frequent repetition to distort the disk or mar its surface, there is shown connected with the button a light spring arm, $F^5$, whose end portion makes the contact with the disk when the armature button is drawn down by the magnet pole.

I claim:—

1. In a magnetic speedometer, comprising a magnet mounted for rotation of its poles about an axis, and a drag disk mounted proximate to the path of rotation of said poles, a damping device for said drag disk comprising an armature positioned proximate to the path of rotation of the magnet poles and mounted for movement toward and from said magnet, means adapted for yieldingly holding said armature away from the magnet and a brake device connected with the armature for movement toward and against the drag disk.

2. In a magnetic speedometer comprising a magnet mounted for rotation of its poles about an axis, and a drag disk mounted proximate to the path of rotation of said poles; an armature button also positioned proximate to the path of rotation of the poles and mounted for movement toward and from the magnet; a spring connected with said armature for holding it away from the magnet and a flexible brake arm extending from the armature button for contact with the drag disk when the button i attracted by the magnet poles.

In testimony whereof, I have hereunto se my hand at Northport, L. I., this 8th day o September, 1916.

JULIA B. STEWART,
*Executrix of John K. Stewart, deceased.*